United States Patent
Feng

(10) Patent No.: US 9,259,679 B2
(45) Date of Patent: Feb. 16, 2016

(54) WASTE GAS TREATMENT APPARATUS

(71) Applicant: ORIENT SERVICE CO., LTD., Taipei (TW)

(72) Inventor: Wu-Yu Feng, Taipei (TW)

(73) Assignee: ORIENT SERVICE CO., LTD., Taipei (TW)

( * ) Notice: Subject to any disclaimer, the term of this patent is extended or adjusted under 35 U.S.C. 154(b) by 342 days.

(21) Appl. No.: 14/020,086

(22) Filed: Sep. 6, 2013

(65) Prior Publication Data

US 2015/0044104 A1  Feb. 12, 2015

(30) Foreign Application Priority Data

Aug. 9, 2013 (TW) .............................. 102128611 A

(51) Int. Cl.
*B01D 50/00* (2006.01)
*B01D 53/00* (2006.01)

(52) U.S. Cl.
CPC ...... *B01D 53/005* (2013.01); *B01D 2257/2025* (2013.01); *B01D 2257/502* (2013.01); *B01D 2257/553* (2013.01); *B01D 2258/0216* (2013.01); *B01D 2258/0283* (2013.01)

(58) Field of Classification Search
CPC .................. B01D 2257/553; B01D 2257/502; B01D 2257/2025; B01D 53/005
USPC ................................................. 422/173, 168
See application file for complete search history.

(56) References Cited

U.S. PATENT DOCUMENTS 7,005,117 B2 * 2/2006 Imamura ................ B01D 53/68
423/240 R

FOREIGN PATENT DOCUMENTS

| JP | 11169663 a | * 6/1999 | ............ B01D 53/68 |
|---|---|---|---|
| TW | 508263 | 11/2002 | |
| TW | 200900135 A | 1/2009 | |
| TW | 200904511 A | 2/2009 | |
| TW | 200905723 A | 2/2009 | |

* cited by examiner

*Primary Examiner* — Tom P Duong
(74) *Attorney, Agent, or Firm* — Chun-Ming Shih

(57) ABSTRACT

A waste gas treatment apparatus includes a waste gas treatment trough and a partition. The waste gas treatment trough is formed with a waste gas inlet and a waste gas outlet. An annular heater is provided in the waste gas treatment trough. A heating rod is provided in the annular heater. A heating chamber is formed between the annular heater and the heating rod. The partition is disposed between the annular heater and the heating rod. The heating chamber is partitioned to form a gas channel through the partition. The gas channel has an inlet end communicating with the waste gas inlet and an outlet end communicating with the waste gas outlet through the heating chamber. The present invention can prolong the time that the harmful waste gas is heated and purified in the heating chamber to enhance the purification efficiency of the harmful waste gas.

12 Claims, 5 Drawing Sheets

WASTE GAS TREATMENT APPARATUS

BACKGROUND OF THE INVENTION

1. Field of the Invention

The present invention relates to a waste gas purification treatment technique, and more particularly to a waste gas treatment apparatus.

2. Description of the Prior Art

A semiconductor chip factory, a photoelectricity factory, a panel factory or a solar panel factory may generate harmful waste gas when producing semiconductor products, such as wafers or panels. For example, the waste gas generated by a semiconductor chip factory includes SiH4, Cl2, PFC (per-fluoro-compounds) and so on. In general, people use a wet method, an adsorbent method, a heat decomposition method or a burning method to treat the aforesaid gas.

Wherein, the heat decomposition method means that a heater is provided in a waste gas treatment trough and formed with a heating chamber in the waste gas treatment trough. When harmful waste gas enters the waste gas treatment trough and flows to the heating chamber, the harmful waste gas is heated through the heater to catalyze the harmful material of the harmful waste gas. The harmful material is decomposed to become harmless material. The wet method means that a washing room having a plurality of sprinklers is provided. The sprinklers spray water to contact with the harmful waste gas so as to dissolve the harmful watersoluable material of the harmful waste gas, providing a purification effect. The gas used for burning is composed of $CH_4$, $C_2H_6$, $C_3H_8$ and air in a specific ratio. After burning, $CH_4$ will generate harmful gas, such as CO, to cause a repeated pollution. These days, the semiconductor industry adopts the heat decomposition method cooperating with the wet method to treat the waste gas in order to purify the waste gas.

However, a traditional waste gas treatment apparatus doesn't have the design to prolong the time that the harmful waste gas passes the waste gas treatment trough. The harmful waste gas passes the waste gas treatment trough in a short time, which causes that the waste gas cannot be heated sufficiently to influence the purification efficiency. Therefore, how to prolong the time that the harmful waste gas is heated in the waste gas treatment trough becomes an important issue. Accordingly, the inventor of the present invention has devoted himself based on his many years of practical experiences to solve these problems.

SUMMARY OF THE INVENTION

The primary object of the present invention is to provide a waste gas treatment apparatus to prolong the heating and purification time for the harmful waste gas in the waste gas treatment trough so as to enhance the purification efficiency of the harmful waste gas.

In order to achieve the aforesaid object, the waste gas treatment apparatus of the present invention comprises a waste gas treatment trough and a partition. The waste gas treatment trough is formed with a waste gas inlet and a waste gas outlet. An annular heater is provided in the waste gas treatment trough. A heating rod is provided in the annular heater. A heating chamber is formed between the annular heater and the heating rod. The partition is disposed between the annular heater and the heating rod. The heating chamber is partitioned to form a gas channel through the partition. Wherein, the gas channel has an inlet end communicating with the waste gas inlet and an outlet end communicating with the waste gas outlet through the heating chamber. Waste gas from the waste gas inlet passes the gas channel to enter the heating chamber and flow to the waste gas outlet.

Thereby, the present invention provides the partition disposed between the annular heater and the heating rod to form the gas channel. The gas channel is to prolong the time that the waste gas passes through the heating chamber, such that the waste gas can be heated adequately to purify the harmful material contained in the harmful waste gas to prevent the surroundings from being polluted.

Preferably, the gas channel is a snaking channel to prolong the time that the waste gas passes the heating chamber through the gas channel, such that the waste gas can be heated adequately in the heating chamber to enhance the purification efficiency of the harmful waste gas.

Preferably, the partition comprises an outer partition and an inner partition. The outer partition is disposed between the annular heater and the heating rod. The inner partition is disposed between the outer partition and the heating rod. The heating chamber is partitioned to form the gas channel through the outer partition and the inner partition. Preferably, the gas channel includes a first gas channel, a second gas channel and a third gas channel. The first gas channel is formed between the annular heater and the outer partition. The second gas channel is formed between the outer partition and the inner partition. The third gas channel is formed between the inner partition and the heating rod. The inlet end of the gas channel communicates with the outlet end through the first gas channel, the second gas channel and the third gas channel in sequence. The heating chamber is partitioned to form the gas channel through the outer partition and the inner partition to prolong the time that the waste gas passes the heating chamber so as to enhance the purification efficiency of the harmful waste gas.

Preferably, the waste gas treatment apparatus further comprises a washing room. The washing room is disposed at one end of the waste gas inlet or one end of the waste gas outlet. Preferably, the waste gas treatment apparatus further comprises washing rooms. The washing rooms are respectively disposed at one end of the waste gas inlet and one end of the waste gas outlet. The washing room is adapted to dissolve the harmful watersoluable material of the harmful waste gas and to cool the high-temperature waste gas. This is beneficial to discharge the waste gas to the environment, not polluting the surroundings.

Preferably, the waste gas treatment apparatus further comprises a high-pressure air inlet formed on the waste gas treatment trough and communicating with the inlet end of the gas channel. The high-pressure air is guided to bring the harmful waste gas to pass the gas channel and to provide oxygen for the harmful waste gas to be catalyzed by the high-temperature heat.

Preferably, the waste gas treatment apparatus further comprises a heat insulation layer to wrap the outside of the waste gas treatment trough. The heat insulation layer decreases the influence of the high temperature generated by the waste gas treatment trough on the surroundings.

DETAILED DESCRIPTION OF THE PREFERRED EMBODIMENTS

Embodiments of the present invention will now be described, by way of example only, with reference to the accompanying drawings.

Figure 1:
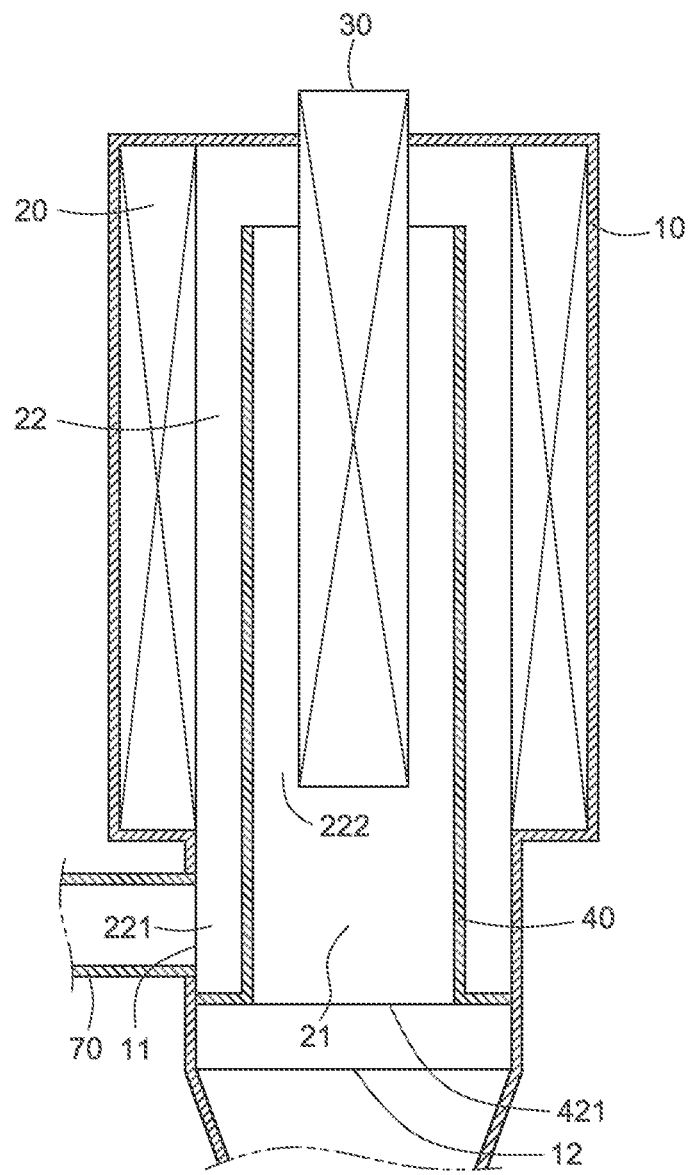
FIG. 1 is a schematic view according to a first embodiment of the present invention.

As shown in FIG. 1, the waste gas treatment apparatus according to a first embodiment of the present invention comprises a waste gas treatment trough 10, an annular heater 20, a heating rod 30 and a partition 40.

The waste gas treatment trough 10 is a metallic container. The wall of the waste gas treatment trough 10 is formed with a waste gas inlet 11 and a waste gas outlet 12. The waste gas inlet 11 communicates with the waste gas outlet 12. The waste gas inlet 11 is connected with a waste gas pipe 70. The waste gas from the waste gas pipe 70 enters the waste gas treatment trough 10 through the waste gas inlet 11 and flows out through the waste gas outlet 12. The annular heater 20 is disposed in the waste gas treatment trough 10. The heating rod 30 is disposed in the annular heater 20. Preferably, the heating rod 30 is disposed at the center of the annular heater 20. A heating chamber 21 is formed between the annular heater 20 and the heating rod 30. After the harmful waste gas enters the heating chamber 21, it will be catalyzed by the high-temperature heat generated by the annular heater 20 and the heating rod 30 to enhance the purification effect of the harmful waste gas. In this embodiment, the annular heater 20 and the heating rod 30 are electrothermal-type heaters. Compared to the combustion-type heater, they can prevent the fuel gas from generating harmful gas after burning to cause repeated pollution.

The partition 40 is annular and disposed between the annular heater 20 and the heating rod 30. Through the partition 40, the heating chamber 21 is partitioned to form a gas channel 22. The gas channel 22 has an inlet end 221 at one end thereof adjacent the waste gas inlet 11 and an outlet end 222 at another end thereof adjacent the waste gas outlet 12. The waste gas passes the inlet end 221 through the waste gas inlet 11 to enter the gas channel 22 and flows to the waste gas outlet 12 through the outlet end 222. The waste gas passes through the gas channel 22 to prolong the route that the waste gas passes through the heating chamber 21 so as to increase the time for the waste gas to pass through the heating chamber 21, such that the waste gas can be heated adequately.

Figure 2:
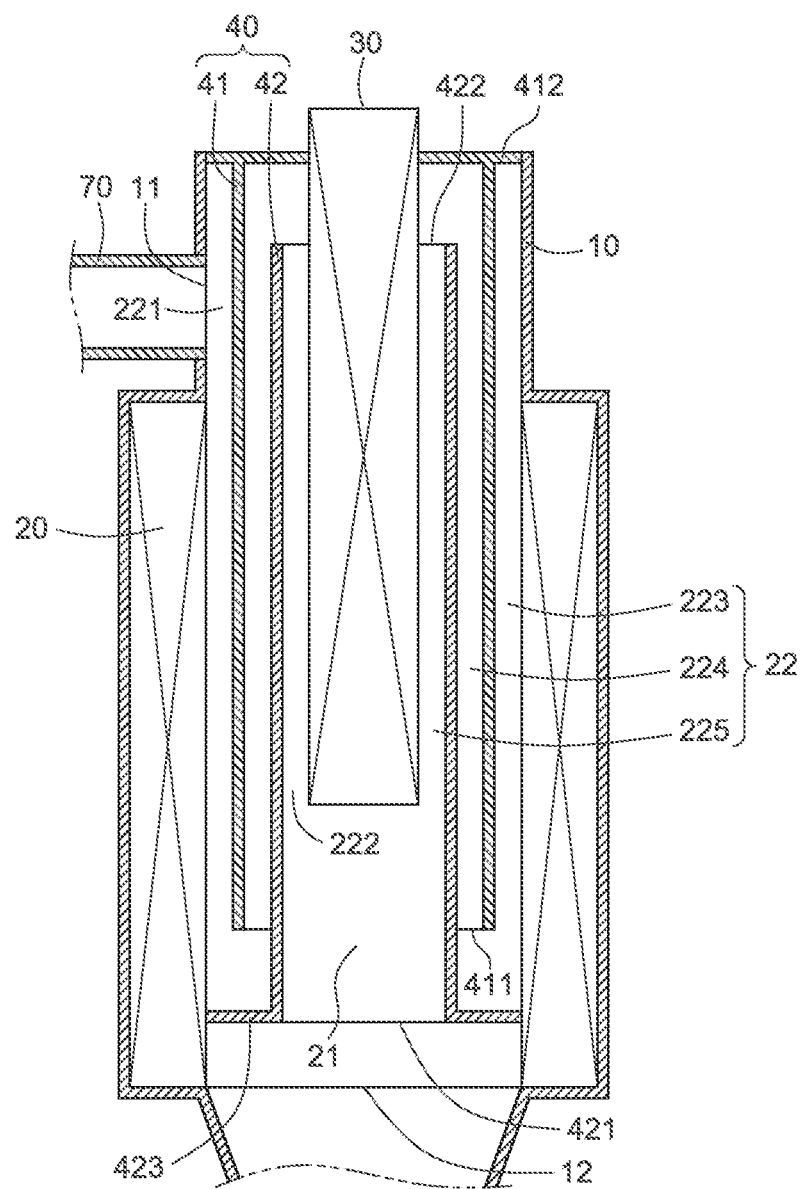
FIG. 2 is a schematic view according to a second embodiment of the present invention.

FIG. 2 is a schematic view according to a second embodiment of the present invention, which is substantially similar to the first embodiment with the exceptions described hereinafter. The partition 40 comprises an outer partition 41 and an inner partition 42. The outer partition 41 and the inner partition 42 are respectively a cylinder. The outer partition 41 has an upper seat portion 412 coupled to the top of the waste gas treatment trough 10 and extending toward the bottom of the waste gas treatment trough 10. One end of the outer partition 41, located at the top of the waste gas treatment trough 10 is closed. The other end of the outer partition 41, extending toward the bottom of the waste gas treatment trough 10, has an opening 411. The inner partition 42 has a first opening 421 at one end thereof close to the bottom of the waste gas treatment trough 10 and a second opening 422 at another end thereof close to the top of the waste gas treatment trough 10. The heating chamber 21 between the annular heater 20 and the heating rod 30 is partitioned to form a snaking gas channel 22 through the outer partition 41 and the inner partition 42.

Furthermore, referring to FIG. 2, the gas channel 22 includes a first gas channel 223, a second gas channel 224 and a third gas channel 225. The first gas channel 223 is formed between the annular heater 20 and the outer partition 41. The second gas channel 224 is formed between the outer partition 41 and the inner partition 42. The third gas channel 225 is formed between the inner partition 42 and the heating rod 30. After the harmful waste gas enters the heating chamber 21 through the waste gas inlet 11, it first enters the first gas channel 223 through the inlet end 21, and then enters the second gas channel 224 through the opening 411 of the outer partition 41, and then enters the third gas channel 225 through the second opening 422 of the inner partition 42, and then passes the outlet end 222 and flows to the waste gas outlet 12 through the first opening 421 of the inner partition 42. The annular heater 20 and the heating rod 30 can keep a stable temperature when the harmful waste gas passes through the first gas channel 223 and the third gas channel 225. This is beneficial to maintain the purification effect for the harmful waste gas.

Figure 3:
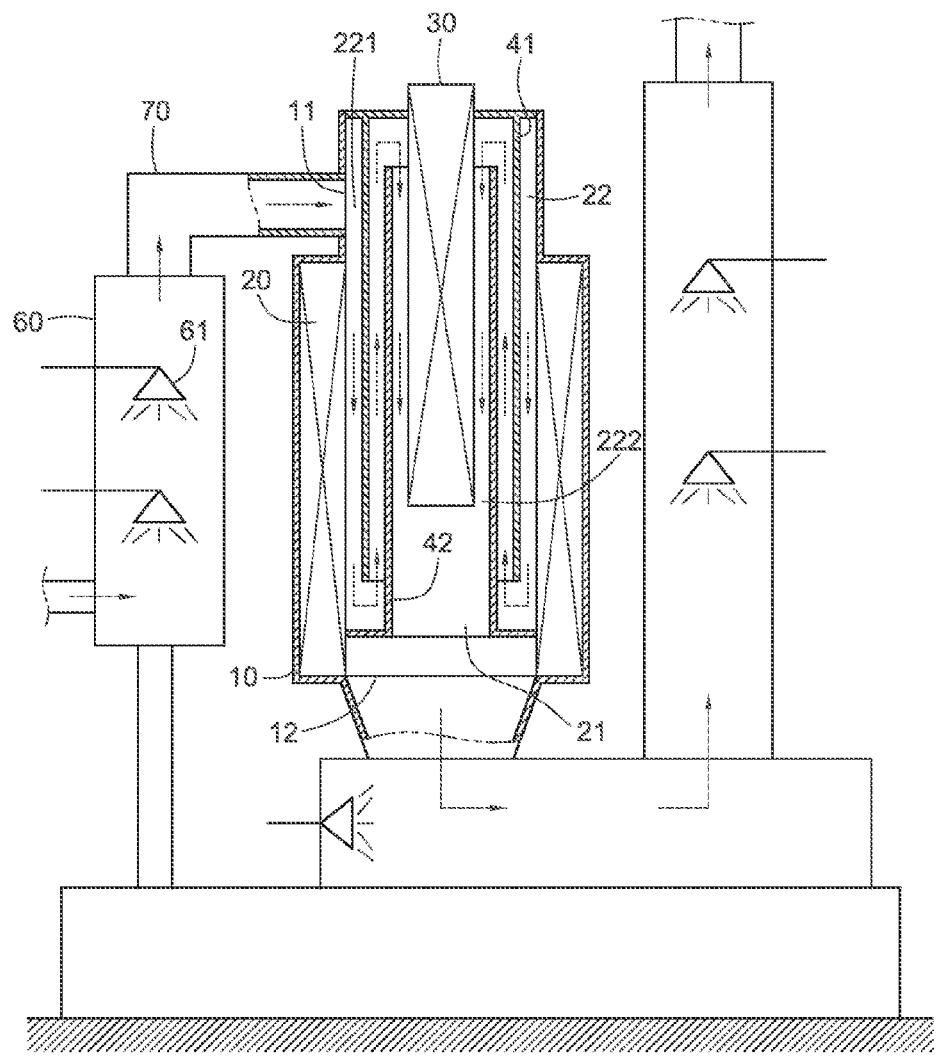
FIG. 3 is a schematic view according to a third embodiment of the present invention.

FIG. 3 is a schematic view according to a third embodiment of the present invention, which is substantially similar to the second embodiment with the exceptions described hereinafter. The present invention further comprises a washing room 60. The washing room 60 is provided with a plurality of sprinklers 61 disposed in the area that the harmful waste gas passes therethrough. The sprinklers 61 spray water to contact with the waste gas so as to dissolve the harmful watersoluable material of the harmful waste gas. This way can purify the harmful waste gas. The washing room 60 can be disposed at an end of the waste gas inlet 11 or an end of the waste gas outlet 12 of the waste gas treatment trough 10, alternatively, it can be disposed at an end of the waste gas inlet 11 and an end of the waste gas outlet 12 of the waste gas treatment trough 10. Wherein, the washing room 60 disposed close to the waste gas inlet 11 is adapted to dissolve the harmful watersoluable material of the harmful waste gas before the waste gas is purified by heating. The washing room 60 disposed close to the waste gas outlet 12 is adapted to dissolve the harmful watersoluable material of the harmful waste gas and to cool the high-temperature waste gas. In this embodiment, an end of the waste gas inlet 11 and an end of the waste gas outlet 12 are respectively provided with the washing room 60. This can dissolve the harmful watersoluable material of the harmful waste gas before heating to prevent it from deteriorating to generate new harmful material when the harmful watersoluable material of the harmful waste gas is heated. After the harmful waste gas is heated to be purified, the washing room 60 is adapted to dissolve the remained harmful watersoluable material and to cool the high-temperature waste gas so as to enhance the purification effect for the harmful waste gas.

Figure 4:
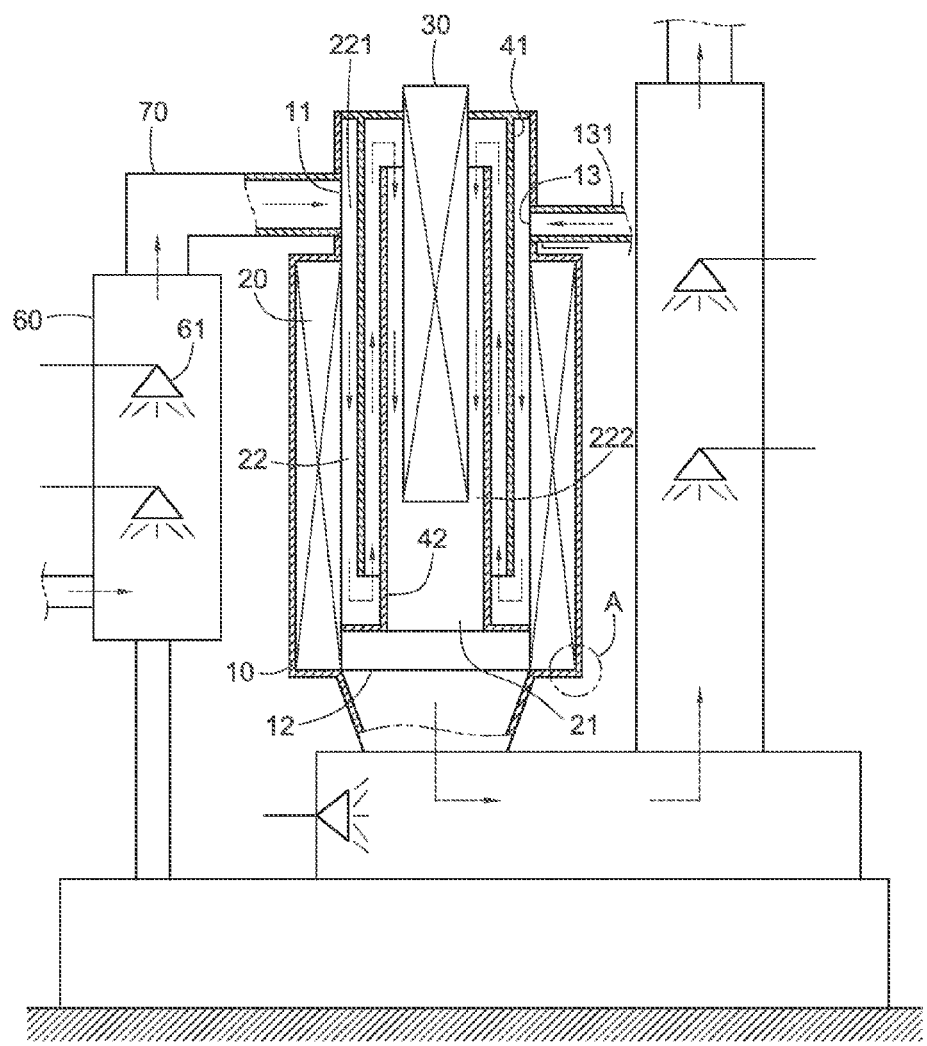
FIG. 4 is a schematic view according to a fourth embodiment of the present invention.

FIG. 4 is a schematic view according to a fourth embodiment of the present invention, which is substantially similar to the third embodiment with the exceptions described hereinafter. The present invention further comprises a high-pressure air inlet 13 formed on the wall of the waste gas treatment trough 10 and communicating with the inlet end 221 of the gas channel 22. The high-pressure air inlet 13 is connected with a high-pressure air pipe 131. Through the high-pressure air pipe 131, high-pressure air is guided to mix with the harmful waste gas to bring the harmful waste gas to pass the gas channel 22 and to provide oxygen for the harmful waste gas to be catalyzed by the high-temperature heat.

Figure 5:
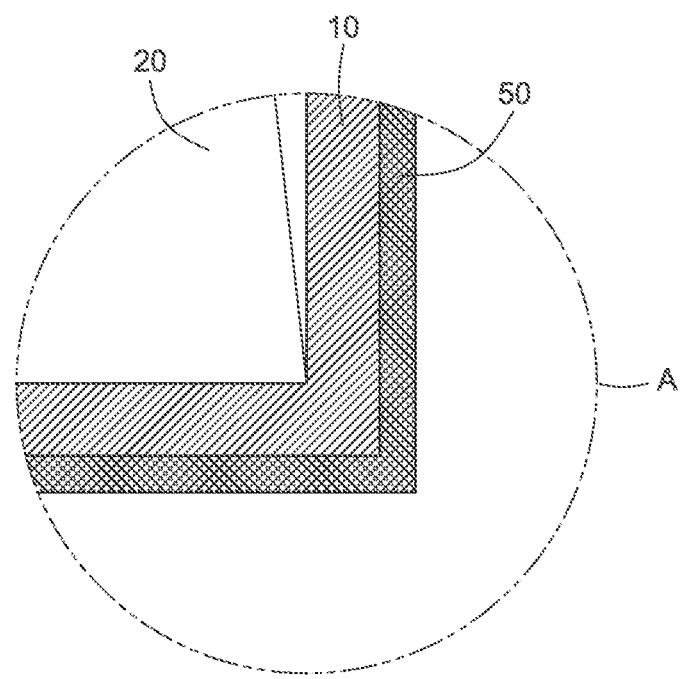
FIG. 5 is an enlarged view of circle A of FIG. 4.

FIG. 5 is an enlarged view of circle A of FIG. 4. A heat insulation layer 50 is provided to wrap the surface of the waste gas treatment trough 10. This can prevent the high temperature to influence the surroundings and people when the waste gas treatment trough 10 is heated to purify the harmful waste gas at 950-1100 degrees centigrade. The heat insulation layer 50 not only decreases the influence of the high temperature generated by the waste gas treatment trough 10 on the surroundings but also prevents the heat energy in the waste gas treatment trough 10 from flowing to the outside to result in that the temperature drops to influence the purification efficiency.

In addition, the waste gas treatment apparatus of the present invention can be used to purify the harmful waste gas generated by producing industrial products. In this embodiment, the waste gas treatment apparatus is disposed in a semiconductor chip factory, a photoelectricity factory, a panel factory or a solar panel factory to purify the harmful waste gas generated by producing semiconductor products.

According to the explanation of the aforesaid embodiments, the waste gas treatment apparatus of the present invention first uses the annular heater and the heating rod with their inner and outer sides to heat the harmful waste gas. This can avoid lower purification efficiency because of uneven heat to heat the harmful waste gas. Besides, by using the outer partition and the inner partition, the heating chamber is partitioned to form a snaking gas channel to prolong the heating and purification time for the harmful waste gas in the waste gas treatment trough so as to enhance the purification efficiency of the harmful waste gas.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A waste gas treatment apparatus, comprising:
   a waste gas treatment trough, the waste gas treatment trough being formed with a waste gas inlet and a waste gas outlet, an annular heater being provided in the waste gas treatment trough, a heating rod being provided in the annular heater, a heating chamber being formed between the annular heater and the heating rod; and
   a partition disposed between the annular heater and the heating rod, the heating chamber being partitioned to form a gas channel through the partition;
   wherein, the gas channel has an inlet end communicating with the waste gas inlet and an outlet end communicating with the waste gas outlet through the heating chamber, waste gas from the waste gas inlet passes the gas channel to enter the heating chamber and flow to the waste gas outlet;
   wherein the partition comprises an outer partition and an inner partition, the outer partition being disposed between the annular heater and the heating rod, the inner partition being disposed between the outer partition and the heating rod, the heating chamber being partitioned to form the gas channel through the outer partition and the inner partition.

2. The waste gas treatment apparatus as claimed in claim 1, wherein the gas channel is a snaking channel.

3. The waste gas treatment apparatus as claimed in claim 1, wherein the gas channel includes a first gas channel, a second gas channel and a third gas channel, the first gas channel being formed between the annular heater and the outer partition, the second gas channel being formed between the outer partition and the inner partition, the third gas channel being formed between the inner partition and the heating rod, the inlet end of the gas channel communicating with the outlet end through the first gas channel, the second gas channel and the third gas channel in sequence.

4. The waste gas treatment apparatus as claimed in claim 1, further comprising a washing room, the washing room being disposed at an end of the waste gas inlet or an end of the waste gas outlet.

5. The waste gas treatment apparatus as claimed in claim 1, further comprising washing rooms, the washing rooms being respectively disposed at an end of the waste gas inlet and an end of the waste gas outlet.

6. The waste gas treatment apparatus as claimed in claim 1, further comprising a high-pressure air inlet formed on the waste gas treatment trough and communicating with the inlet end of the gas channel.

7. The waste gas treatment apparatus as claimed in claim 1, further comprising a heat insulation layer to wrap an outside of the waste gas treatment trough.

8. A waste gas treatment apparatus, comprising:
   a waste gas treatment trough, the waste gas treatment trough being formed with a waste gas inlet and a waste gas outlet, an annular heater being provided in the waste gas treatment trough, a heating rod being provided in the annular heater, a heating chamber being formed between the annular heater and the heating rod; and
   a partition disposed between the annular heater and the heating rod, the heating chamber being partitioned to form a gas channel through the partition;
   wherein, the gas channel has an inlet end communicating with the waste gas inlet and an outlet end communicating with the waste gas outlet through the heating chamber, waste gas from the waste gas inlet passes the gas channel to enter the heating chamber and flow to the waste gas outlet;
   wherein the gas channel includes a first gas channel, a second gas channel and a third gas channel, the first gas channel being formed between the annular heater and the outer partition, the second gas channel being formed between the outer partition and the inner partition, the third gas channel being formed between the inner partition and the heating rod, the inlet end of the gas channel communicating with the outlet end through the first gas channel, the second gas channel and the third gas channel in sequence.

9. The waste gas treatment apparatus as claimed in claim 8, further comprising a washing room, the washing room being disposed at an end of the waste gas inlet or an end of the waste gas outlet.

10. The waste gas treatment apparatus as claimed in claim 8, further comprising washing rooms, the washing rooms being respectively disposed at an end of the waste gas inlet and an end of the waste gas outlet.

11. The waste gas treatment apparatus as claimed in claim 8, further comprising a high-pressure air inlet formed on the waste gas treatment trough and communicating with the inlet end of the gas channel.

12. The waste gas treatment apparatus as claimed in claim 8, further comprising a heat insulation layer to wrap an outside of the waste gas treatment trough.

* * * * *